United States Patent [19]

Oswald et al.

[11] Patent Number: 4,572,311

[45] Date of Patent: Feb. 25, 1986

[54] WALKING BEAM ARRANGEMENT FOR ADVERSE TERRAIN VEHICLE

[76] Inventors: Norman D. Oswald, 1406 Braewood Pl., Duncanville, Tex. 75116; Harry S. Mankey, 12107 Snow White Dr., Dallas, Tex. 75234

[21] Appl. No.: 695,405

[22] Filed: Jan. 25, 1985

Related U.S. Application Data

[63] Continuation of Ser. No. 409,821, Aug. 20, 1982, abandoned, and a continuation-in-part of Ser. No. 375,973, May 7, 1982, Pat. No. 4,407,381, which is a continuation of Ser. No. 115,942, Jan. 28, 1980, abandoned, which is a continuation-in-part of Ser. No. 11,857, Feb. 13, 1979, Pat. No. 4,210,218, which is a continuation of Ser. No. 799,328, May 23, 1977, abandoned.

[51] Int. Cl.$^4$ ............................................. B62D 11/02
[52] U.S. Cl. ................................ 180/6.48; 180/24.05; 180/70.1; 188/159
[58] Field of Search ............... 180/70.1, 6.48, 21, 180/22, 23, 24, 24.05, 24.06, 24.07, 24.11, 24.12; 188/18 R, 18 A, 159

[56] References Cited

U.S. PATENT DOCUMENTS

| | | | |
|---|---|---|---|
| 1,606,707 | 11/1926 | Jonston et al. | 180/24.08 |
| 1,836,446 | 12/1931 | Christie | 180/24.12 X |
| 1,858,784 | 5/1932 | Masury | 180/72 |
| 1,902,712 | 3/1933 | Leipert | 180/24.11 |
| 1,938,498 | 12/1933 | Porcello | 180/22 X |
| 1,938,847 | 12/1933 | Masury | 180/72 |
| 2,024,199 | 12/1935 | Barnes et al. | 180/72 |
| 2,091,509 | 8/1937 | Kramer | 180/72 |
| 2,299,006 | 10/1942 | de L. Brown | 180/72 X |
| 2,319,978 | 5/1943 | Colinder | 180/72 X |
| 2,393,324 | 1/1946 | Joy | 180/24.07 X |
| 2,421,123 | 5/1947 | Jensen | 280/47.27 |
| 2,642,144 | 6/1953 | Brewer, Jr. | 180/6.2 X |
| 3,027,959 | 4/1962 | Mailliard | 180/24.07 |
| 3,168,927 | 2/1965 | Garner | 180/22 X |
| 3,299,978 | 1/1967 | Sponsler | 180/22 |
| 3,316,992 | 5/1967 | Schindler | 180/6.2 |
| 3,319,731 | 5/1967 | Kenkel | 180/70.1 X |
| 3,339,662 | 9/1967 | Hanson et al. | 180/70.1 X |

(List continued on next page.)

FOREIGN PATENT DOCUMENTS 887800 1/1962 United Kingdom.
895876 5/1962 United Kingdom.

OTHER PUBLICATIONS

"All Terrain Undercarriages"—Standard Mfg. Co., Inc.
"Melroe Six Wheeler"—Melroe Bros., Inc.

*Primary Examiner*—Joseph F. Peters, Jr.
*Assistant Examiner*—Michael Mar
*Attorney, Agent, or Firm*—Michael A. O'Neil

[57] ABSTRACT

An undercarriage (250) is provided for supporting and propelling a mechanism (252). The undercarriage (250) includes a main frame (256) and side frames (258) pivotally mounted at the fore and aft ends of the main frame and on either side thereof. Two axles (270) are rotatably supported on each side frame (258) and on opposite sides of the pivotal axis of the side frame. An inner wheel (266) and an outer wheel (268) are mounted on the axles (270). A double-acting fluid cylinder (284) is interconnected between the main frame (256) and each side frame (258). Pressurized fluid may be provided to the chambers within the fluid cylinders (284) to lock the side frames in a position so that the inner wheels (266) extend below a plane defined by the bottom surfaces of the outer wheels (268) to facilitate skid steering. The fluid cylinders may also be activated to lock the side frames in a position so that the outer wheels (268) are in contact with the surface (272) to lengthen the effective wheelbase of the undercarriage (250). The fluid cylinders (284) may also be interconnected for flow of pressurized fluid so that the side frames (258) form a walking beam arrangement and the load on the inner and outer wheels (266,268) are maintained substantially equivalent. The fluid cylinders (284) may also be activated to position the side frames (258) to level the mechanism supported by the undercarriage (250).

4 Claims, 29 Drawing Figures

U.S. PATENT DOCUMENTS

| | | | |
|---|---|---|---|
| 3,372,766 | 5/1966 | Lifferth | 180/7 A |
| 3,385,255 | 5/1968 | Raymond et al. | 115/1 |
| 3,429,394 | 2/1969 | Jacono | 180/70.1 |
| 3,444,837 | 5/1969 | Donofrio | 180/22 X |
| 3,525,534 | 8/1970 | Madler et al. | 180/22 X |
| 3,566,825 | 3/1971 | Ruf | 180/24.08 X |
| 3,572,454 | 3/1971 | Siren | 180/6.2 |
| 3,592,280 | 7/1971 | Wappler | 180/6.2 |
| 3,747,718 | 7/1973 | Gauchet | 180/9.2 R |
| 3,771,615 | 11/1973 | Rieli | 180/6.48 |
| 3,799,362 | 3/1974 | Oswald et al. | 414/634 |
| 3,809,004 | 5/1974 | Leonheart | 180/22 X |
| 3,810,516 | 5/1974 | Reimer | 180/24.05 X |
| 4,009,761 | 3/1977 | Meyer | 180/6.2 |
| 4,056,158 | 11/1977 | Ross | 180/6.48 |
| 4,210,218 | 7/1980 | Oswald et al. | 180/24.12 |
| 4,252,203 | 2/1981 | Oswald et al. | 180/6.48 |
| 4,272,221 | 6/1981 | Oswald et al. | 414/634 |
| 4,278,140 | 7/1981 | Oswald et al. | 180/6.48 |
| 4,278,141 | 7/1981 | Oswald et al. | 180/6.48 |
| 4,285,627 | 8/1981 | Oswald et al. | 414/695.5 |

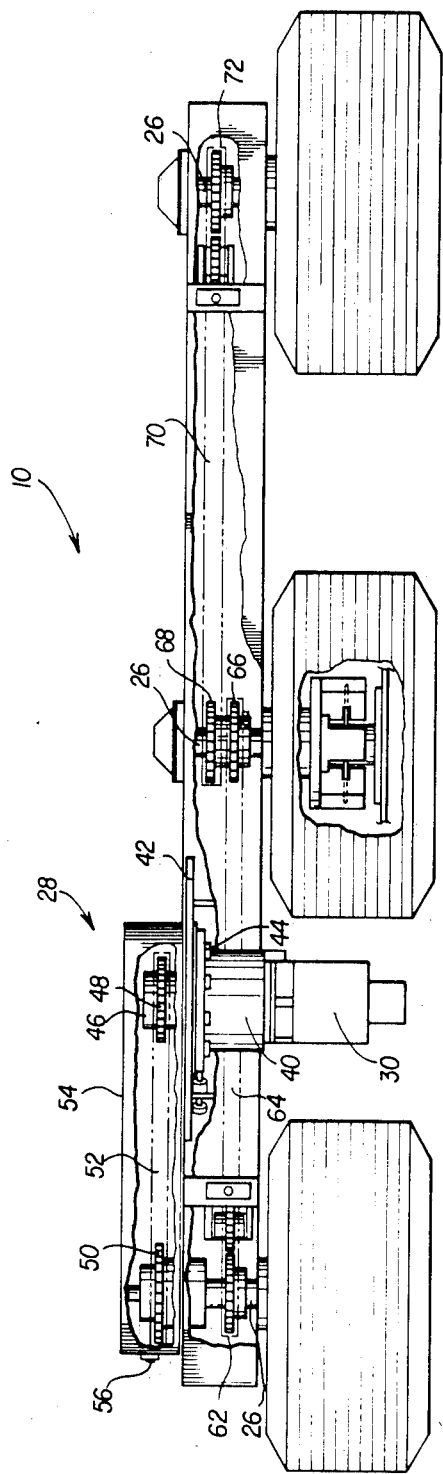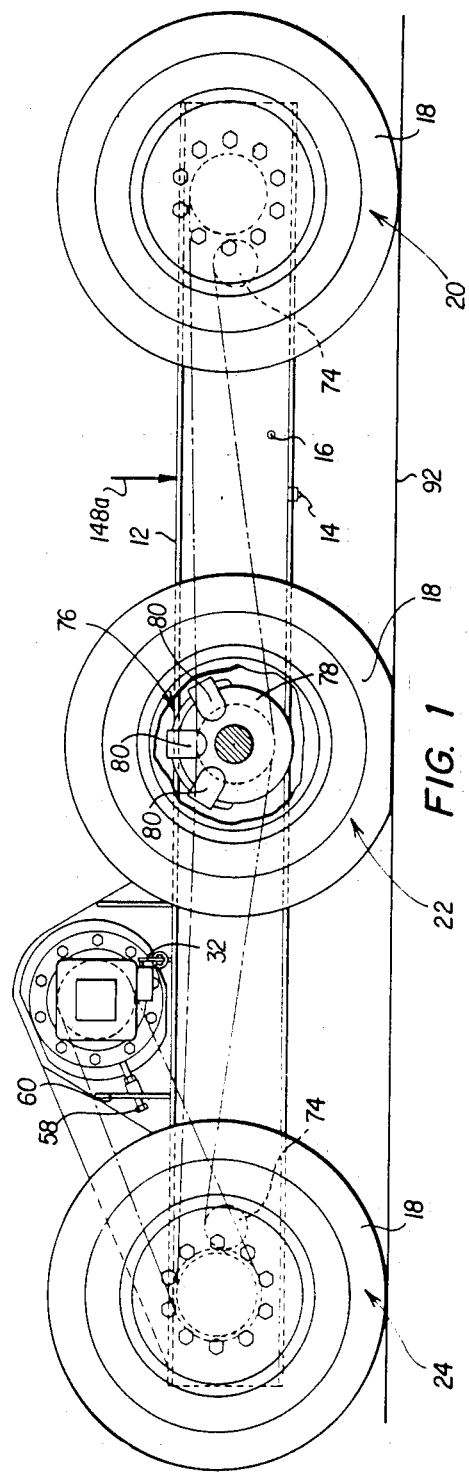
FIG. 2
FIG. 1

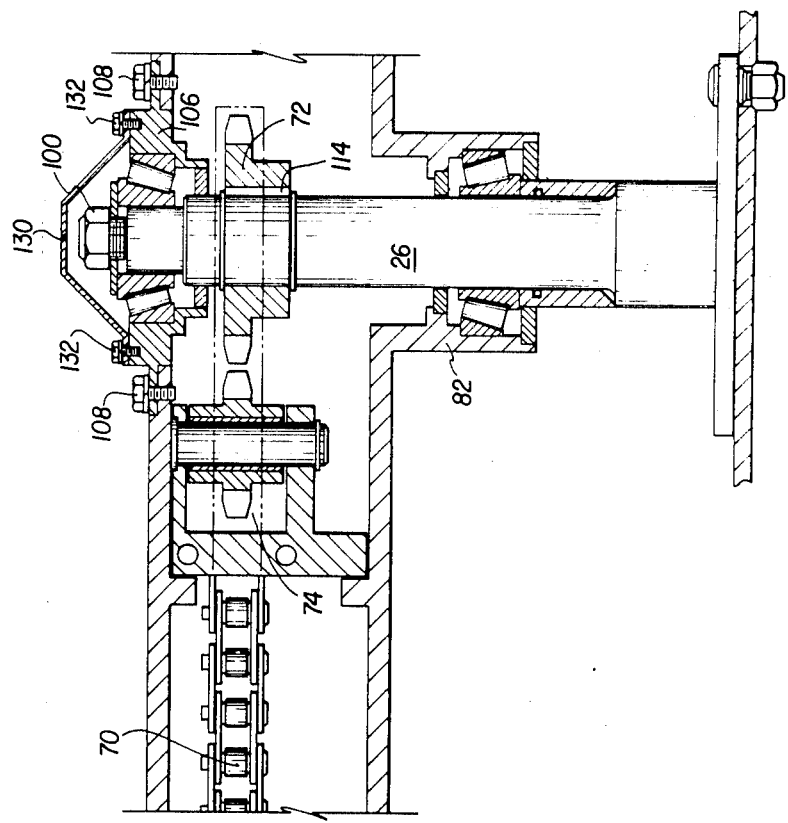
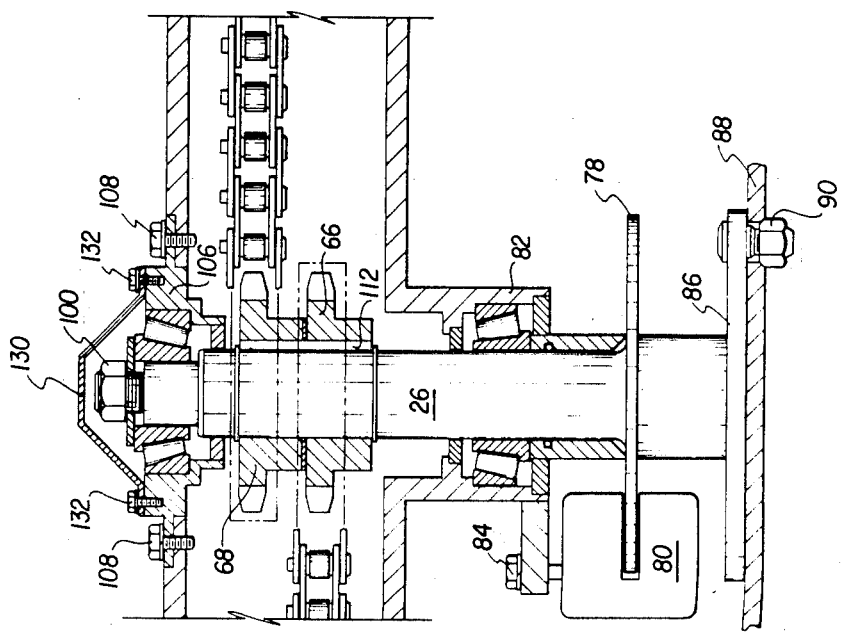
FIG. 3b

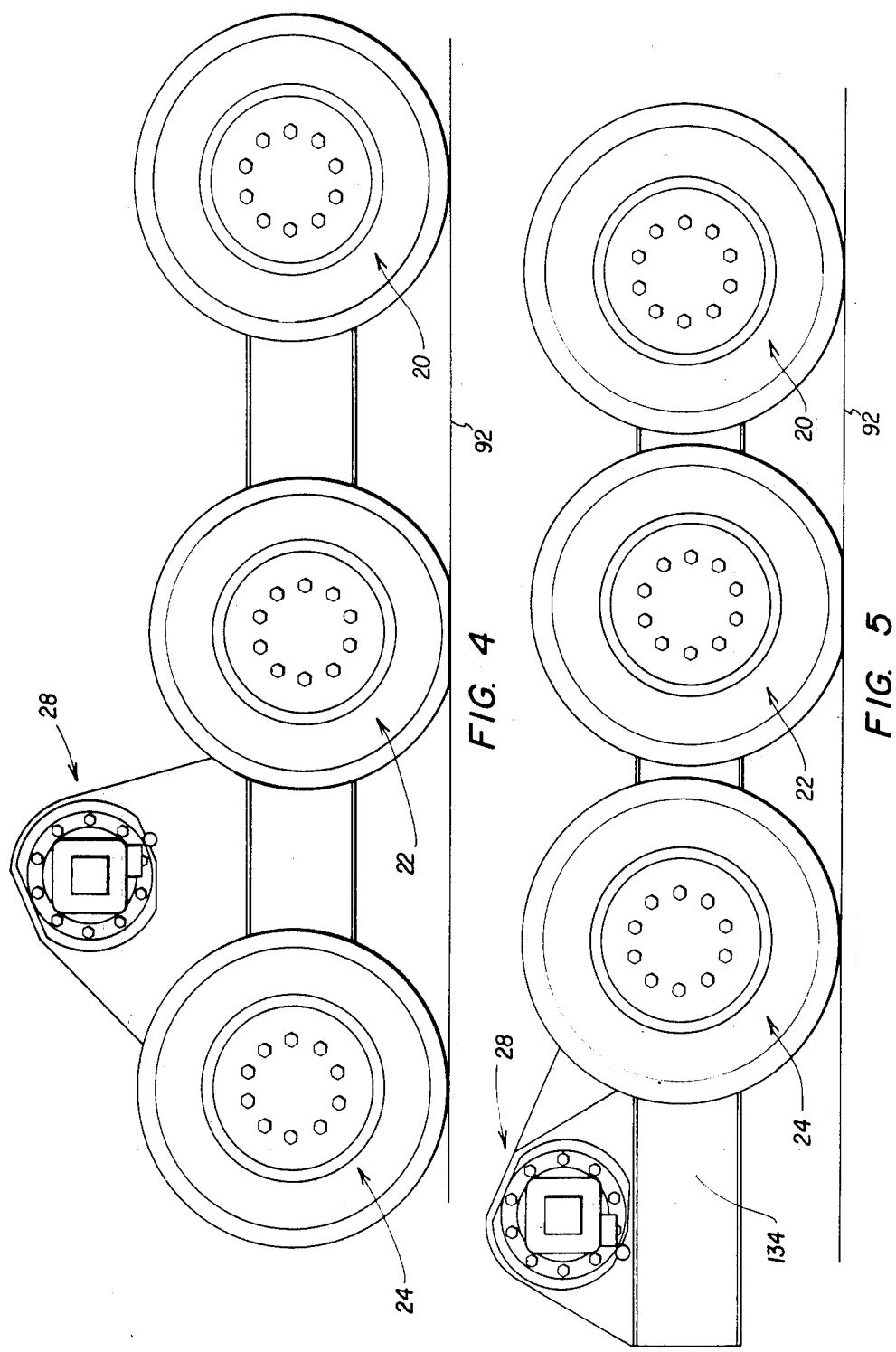

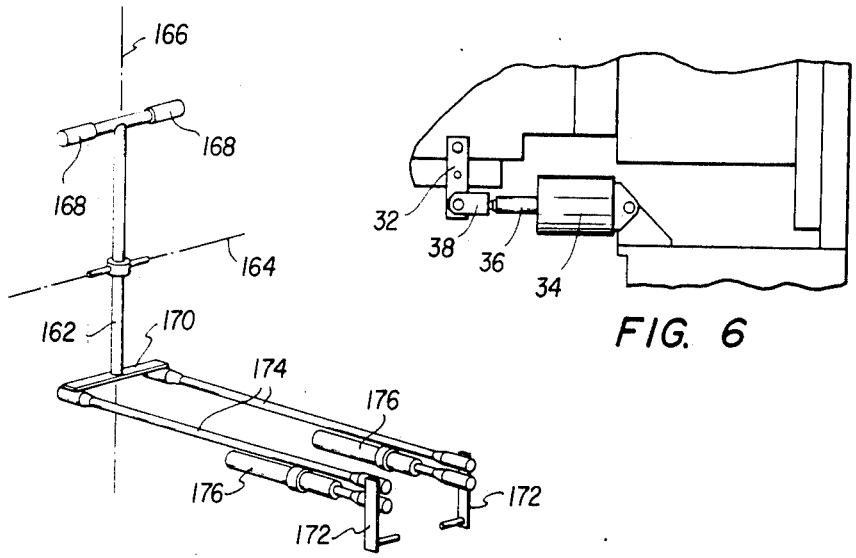
FIG. 6
FIG. 9
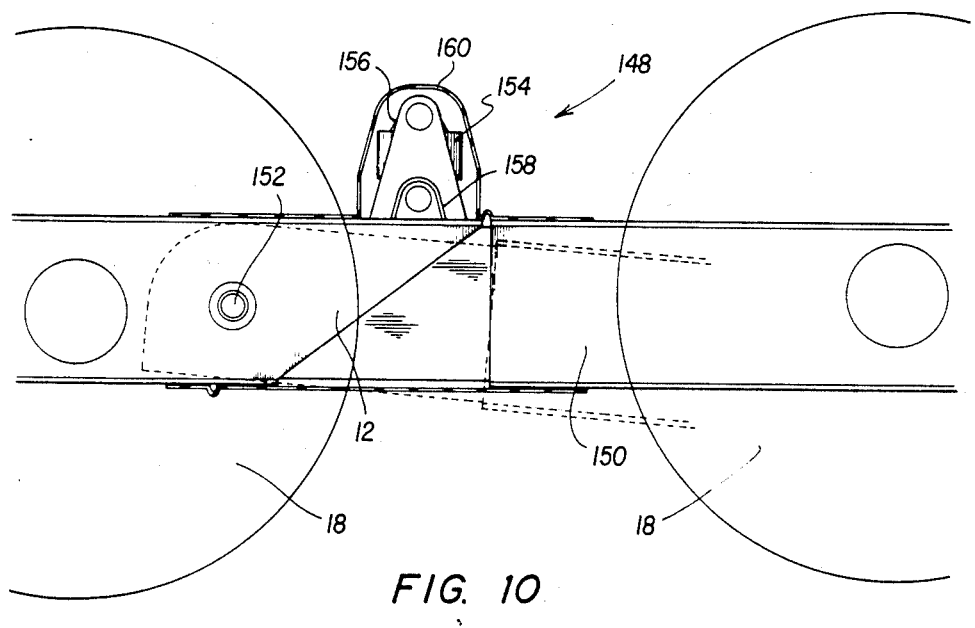
FIG. 10

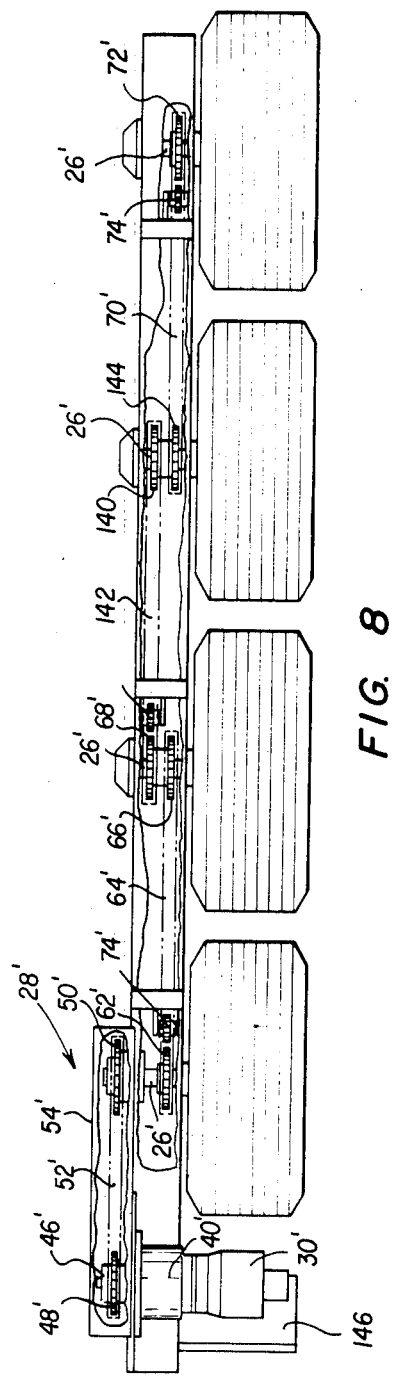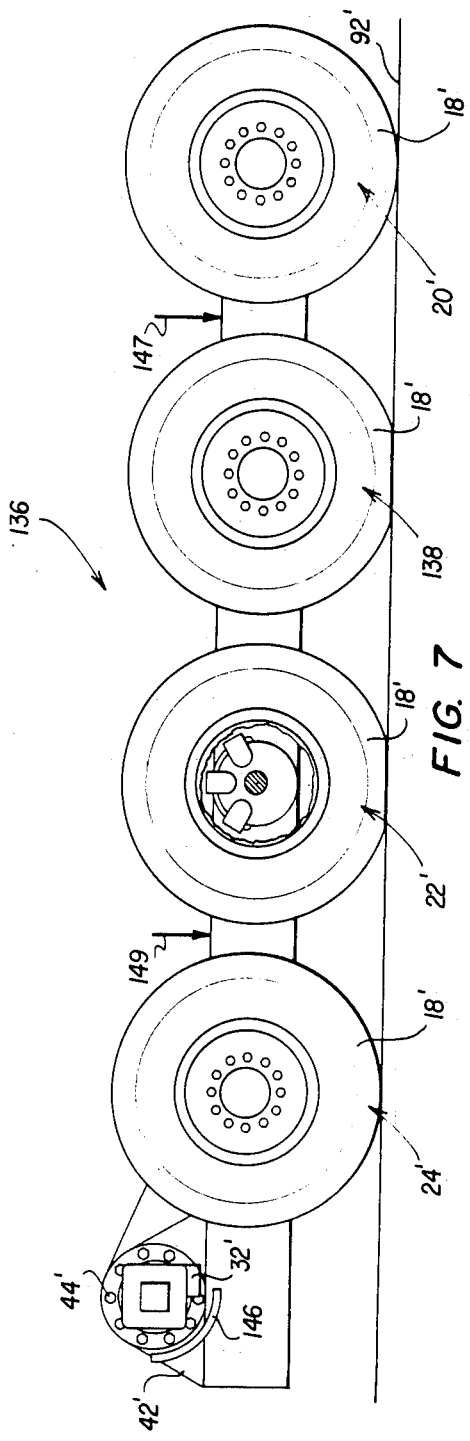

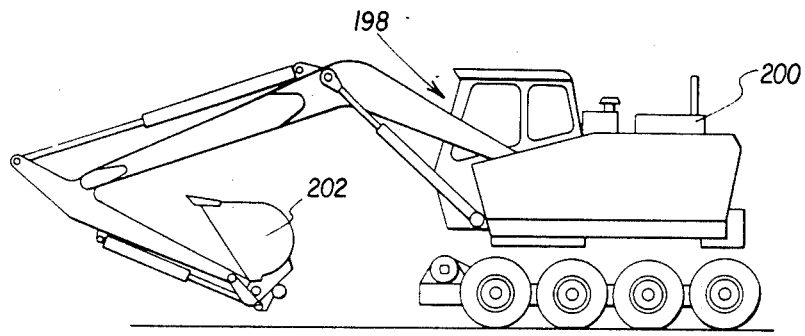
FIG. 14
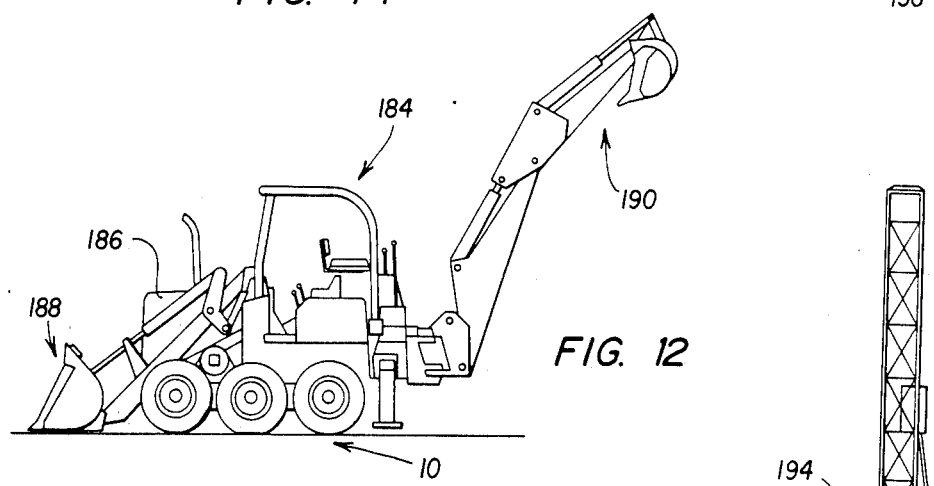
FIG. 12
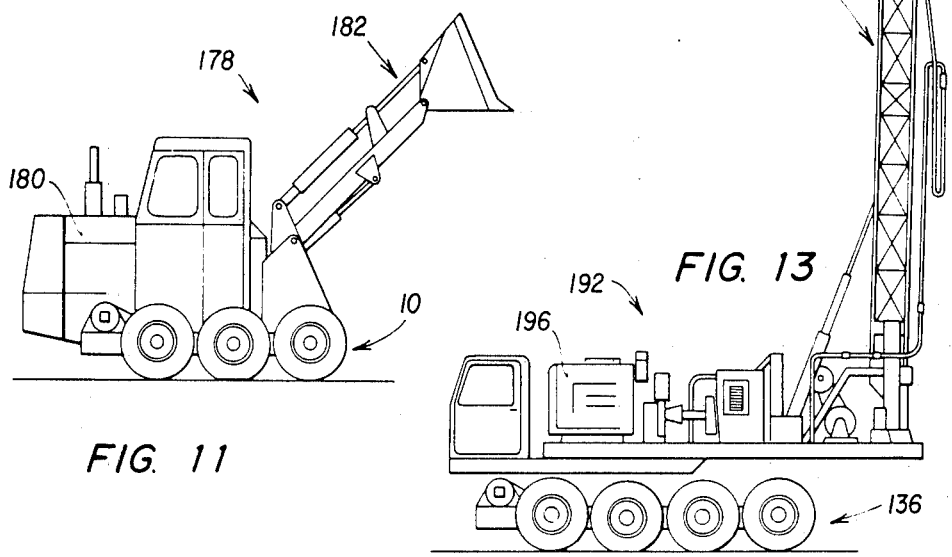
FIG. 13
FIG. 11

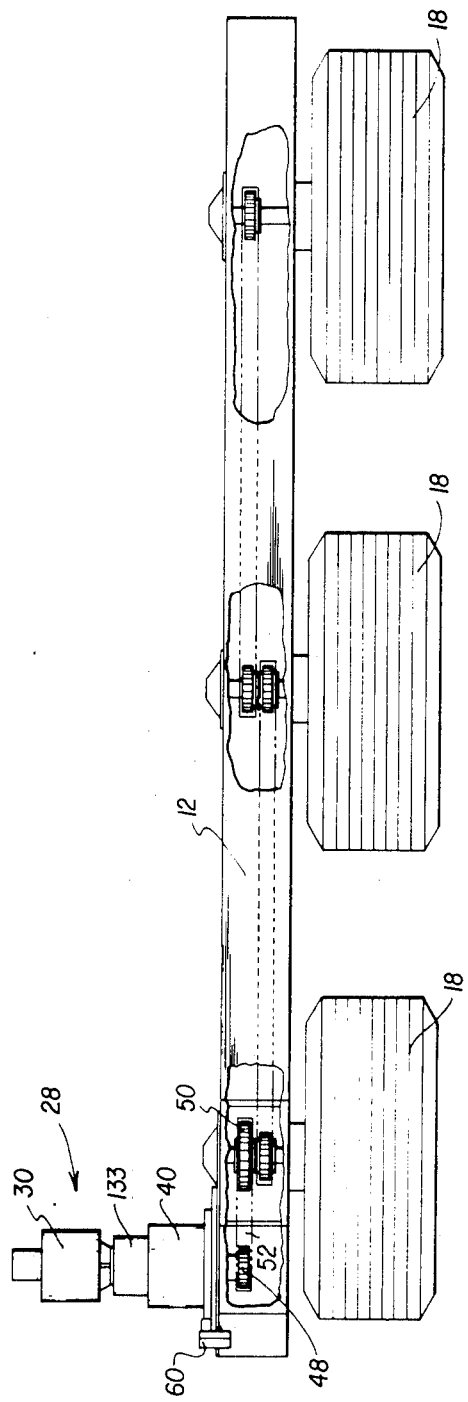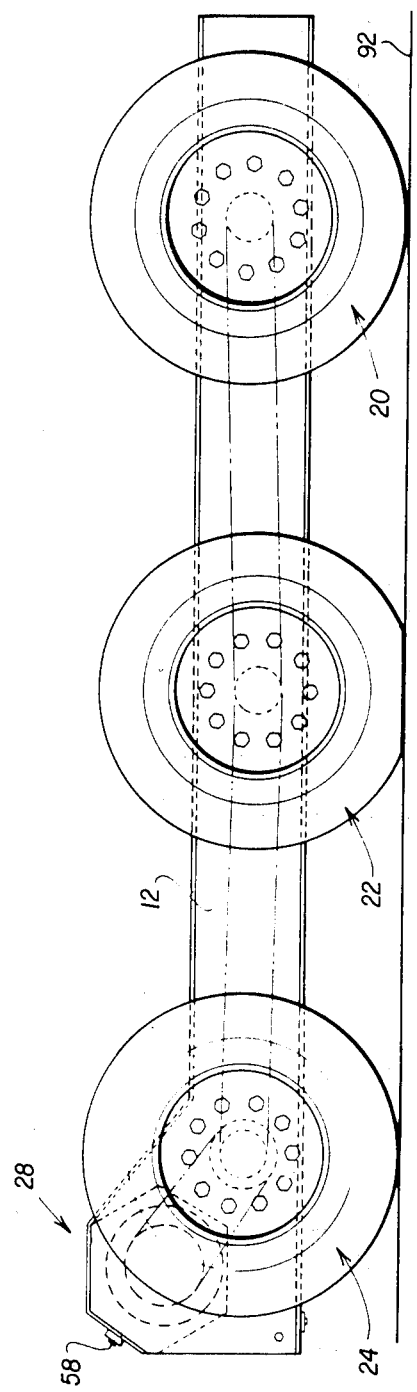

WALKING BEAM ARRANGEMENT FOR ADVERSE TERRAIN VEHICLE

CROSS-REFERENCE TO RELATED APPLICATIONS

This application is a continuation of application Ser. No. 409,821, filed Aug. 20, 1982, now abandoned, and a continuation-in-part of copending application Ser. No. 375,973, filed May 7, 1982, now U.S. Pat. No. 4,407,381 which is a continuation of prior application Ser. No. 115,942, filed Jan. 28, 1980, now abandoned, which is a continuation-in-part of prior application Ser. No. 011,857, filed Feb. 13, 1979, now U.S. Pat. No. 4,210,218, which is a continuation of application Ser. No. 799,328, filed May 23, 1977, now abandoned.

TECHNICAL FIELD

This invention relates generally to undercarriages for adverse terrain vehicles, and more particularly to a multiwheel attachable undercarriage which may be utilized to support and propel virtually any type of mechanism.

BACKGROUND ART

Traditionally, adverse terrain vehicles have been track-type vehicles. For example, track-type bulldozers, loaders, cranes and similar devices have been known for decades. In some instances track-type mechanisms of this type have utilized undercarriages to support and propel a mechanism. Such an undercarriage may comprise a frame for attachment to the mechanism, structure mounted on the frame for guiding a track around a predetermined course, and a drive motor for actuating the track around the course and thereby propelling the mechanism supported by the undercarriage.

More recently, adverse terrain vehicles utilizing wheel members have been developed. For example, see U.S. Pat. No. 3,799,362 granted to applicants herein on Mar. 26, 1974. In U.S. Pat. Nos. 4,210,218, issued July 1, 1980 and 4,210,219 issued July 1, 1980, both granted to applicants herein, there is described an undercarriage whereby many types of mechanisms may be supported and propelled. However, there has not heretofore been provided a wheeled undercarriage wherein wheel members are moveable with respect to the undercarriage to compensate for varied terrain conditions.

DISCLOSURE OF THE INVENTION

The present invention comprises an undercarriage assembly for an adverse terrain vehicle which overcomes the foregoing and other problems long since associated with the prior art. In accordance with the broader aspects of the invention, an undercarriage assembly for supporting and propelling a mechanism is provided which includes a main frame adapted for connection to the mechanism. The assembly further includes at least three axle members rotatably supported at longitudinally spaced points along each side of the main frame and at least one side frame pivotally mounted to each side of the main frame adjacent one end thereof. Two of the axle members on each side of the main frame are supported in the side frame and on opposite sides of the pivotal axis of the side frame. Each of the axle members have a wheel receiving member at one end thereof and at least one wheel member is mounted on and secured to the wheel receiving member of each of the axle members. At least one double-acting fluid cylinder interconnects each of the side frames and the main frame for pivoting the side frames and pump means are provided for providing pressurized fluid to each chamber of the fluid cylinders.

In accordance with another aspect of the present invention, an undercarriage assembly for supporting and propelling a mechanism is provided which includes a main frame adapted for connection to the mechanism and two side frames pivotally mounted adjacent the fore and aft ends of the main frame and on either side of the main frame. At least two axle members are rotatably supported at longitudinally spaced points along each of the side frames and on opposite sides of the pivotal axis of the side frame, each of the axle members having a wheel receiving member at one end thereof. At least one wheel member is mounted on and secured to the wheel receiving member of each of the axle members. Transmission means are positioned within each of the side frames for drivingly interconnecting the two axle members and drive means operably connect to each of the transmission means for actuation thereof whereby the drive means and the transmission means cause concurrent rotation of the interconnected axle members. At least one double-acting fluid cylinder interconnects the main frame and each of the side frames for pivoting the side frames and pump means are included for providing pressurized fluid to each chamber of the fluid cylinders.

BRIEF DESCRIPTION OF DRAWINGS

A more complete understanding of the invention may be had by referring to the following Detailed Description when taken in conjunction with the accompanying Drawings, wherein:

FIG. 1 is a side view of an undercarriage for an adverse terrain vehicle incorporating a first embodiment of the invention;

FIG. 2 is a top view of the undercarriage shown in FIG. 1 in which certain parts have been broken away more clearly to illustrate certain features of the invention;

FIG. 3b is an enlarged horizontal sectional view of the front portion of the undercarrige of FIG. 1, and comprising a continuation of FIG. 3a;

FIG. 4 is a side view of a first modification of the undercarriage of FIG. 1;

FIG. 5 is a side view of a second modification of the undercarriage of FIG. 1;

FIG. 6 is a side view of the speed shifter assembly mounted on the hydraulic motor of the undercarriage of FIG. 1;

FIG. 7 is a side view of the undercarriage for an adverse terrain vehicle incorporating a second embodiment of the invention;

FIG. 8 is a top view of the undercarriage shown in FIG. 7;

FIG. 9 is a diagrammatic illustration of a portion of a hydrostatic drive control apparatus useful in conjunction with the present invention;

FIG. 10 is a detail of a wheel height adjustment assembly which may be used in conjunction with the invention;

FIG. 11 is an illustration of the application of the invention to a front-end loader;

FIG. 12 is an illustration of the application of the invention to a front-end loader with a backhoe for excavation;

FIG. 13 is an illustration of the application of the invention to a mobile drilling rig;

FIG. 14 is an illustration of the application of the invention to backhoe excavation;

FIG. 15 is a side view of a third modification of the undercarriage of FIG. 1;

FIG. 16 is a top view of the undercarriage shown in FIG. 15 in which certain parts have been broken away to illustrate more clearly certain features of the invention;

DETAILED DESCRIPTION

Figure 3A:
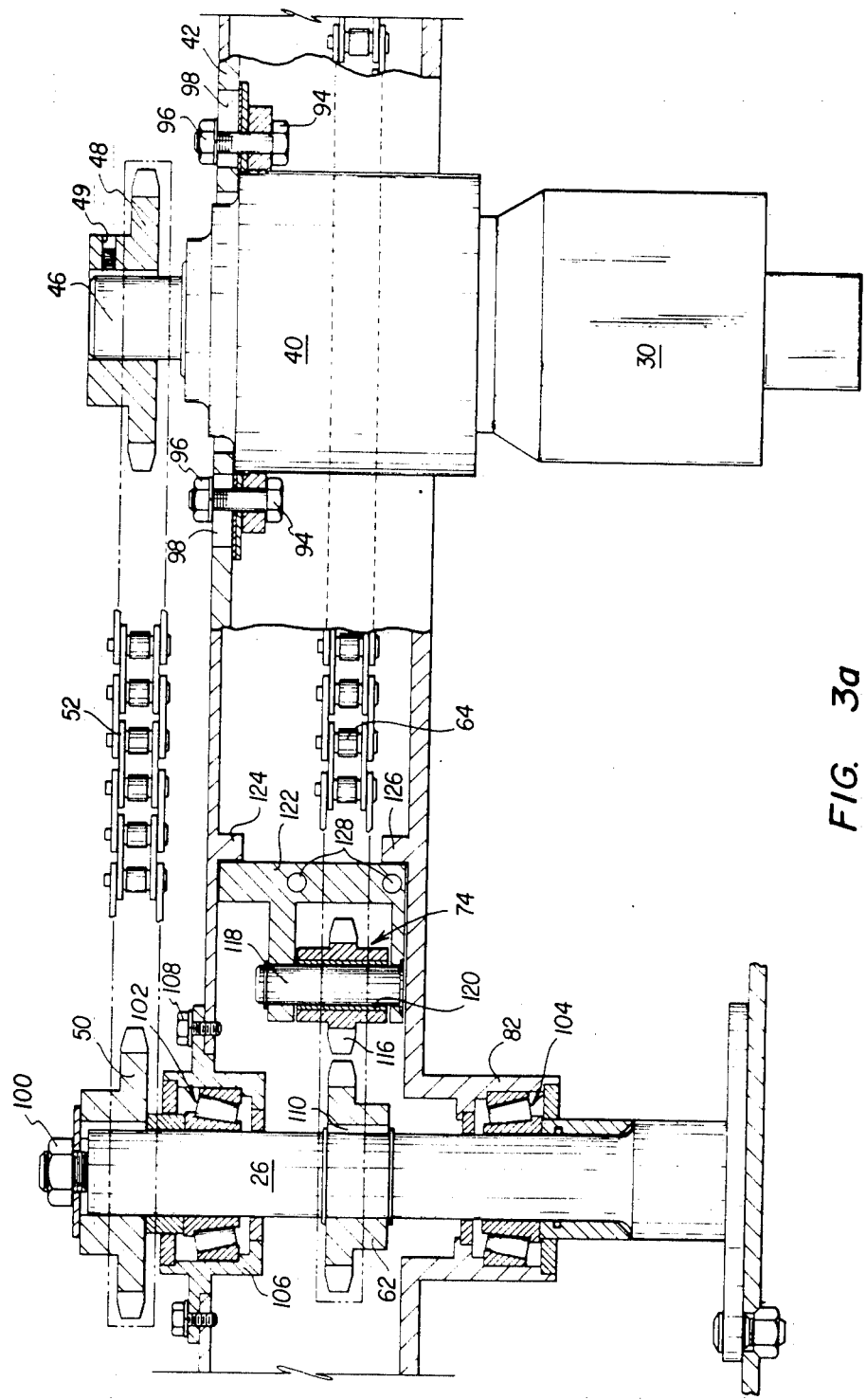
FIG. 3a is an enlarged horizontal sectional view of the rear portion of the undercarriage of FIG. 1.

Referring now to the Drawings, and particularly to FIGS. 1 and 2 thereof, there is shown a detachable undercarriage for an adverse terrain vehicle 10 incorporating the invention. Normally, of course, a pair of parallel undercarriages 10 are employed to support the adverse terrain vehicle. The undercarriage 10 consists of an elongate hollow load-bearing frame 12. Frame 12 is formed entirely of a material such as steel characterized by high strength and rigidity to permit attachment of undercarriage 10 to virtually any type of mechanism by connections at selected points along the entire length and around the entire periphery of frame 12. A related feature of this structure is greater load carrying capacity. Furthermore, frame 12 can be of sealed construction so that it can serve as a lubricant reservoir, if desired, as well as a structural member. Drain plugs 14 and 16 are located at the bottom and outside surfaces, respectively, of frame 12 to facilitate draining or replenishing of lubricants therein.

The undercarrige 10 is supported by three wheels 18; the three wheels including a forward wheel 20, a middle wheel 22, and a rear wheel 24. The wheels 18 are of equal diameter and may include tires of either a solid or a pneumatic type. Wheels 18 rotate about axles 26. Preferably all three wheels 18 are positioned on the same side of frame 12; however, depending on the particular adverse terrain vehicle, it may be desirable to locate one wheel 18 on the opposite side of frame 12. Preferably, axles 26 extend completely through frame 12 and are rotatably supported within both adjacent vertical surfaces of frame 12.

Also included in undercarriage 10 is drive assembly 28. Drive assembly 28 incorporates a motor 30 which can be of a dual speed variety in that structure is provided within motor 30 for selecting either a high or low speed range of operation. Such selection is effected by manipulation of lever 32. Alternatively, motor 30 can be of the constant speed variety. In addition, motor 30 can be of the electric or the hydraulic types. Referring momentarily to FIG. 6 in conjunction with FIGS. 1 and 2, undercarriage 10 is provided with a fluid operated cylinder 34 having a piston 36 connected to lever 32 by means of link 38. Cylinder 34 is adapted for operation from a remote point, such as the operator's compartment of an adverse terrain vehicle incorporating undercarriage 10, to selectively place motor 30 in the desired operational range.

Referring again to FIGS. 1 and 2, motor 30 is connected directly to speed reducer 40, which can be a multiple or constant speed type. Speed reducer 40 is slidably mounted on frame extension 42 by means of bolts 44. Frame extension 42 extends upwardly from the inside rearward top surface of frame 12 and speed reducer 40 is bolted substantially perpendicular thereto. Speed reducer 40 has output shaft 46 to which drive sprocket 48 is attached by means of setscrew 49, as is best shown in FIG. 3a. If, for example, motor 30 is of the hydraulic type, motive energy is received from the output of remotely located hydraulic pumps (not shown) driven by an engine mounted on the adverse terrain vehicle to which undercarriage 10 is attached. The power transmission by means of the pressurized hydraulic fluid from the aforementioned pumps, or from a remote power source (not shown) in the case of an electric motor, to motor 30 and hence to drive sprocket 48 through speed reducer 40 comprises the hydrostatic drive system which functions to both propel and steer undercarriage 10.

Motive power is first applied to drive sprocket 48 which is constrained to second sprocket 50 by means of chain 52. Chain 52, which is constrained around drive sprocket 48 and second sprocket 50, serves to transfer rotative movement to axle 26, upon which first sprocket 50 is mounted. Sprockets 48 and 50 and chain 52 are totally enclosed in a sealed housing 54 which is detachably secured to both frame extension 42 and frame 12. Housing 54 serves not only to protect these parts of the drive system, but more importantly, can constitute a reservoir for lubricant in which chain 52 and sprockets 48 and 50 continuously operate. Accordingly, drain plug 56 is provided at the rearward lower end of housing 54.

A tension adjusting means for chain 52 is provided in bolt 58. Bolt 58 is threadably mounted on brace 60 and acts in compression directly against the collar of speed reducer 40, which is slidably mounted on frame extension 42. Thus, by either clockwise or counterclockwise rotation of bolts 58, tension in chain 52 may be varied.

Motor 30 is in direct operative relationship with the forward, middle and rearward wheels, 20, 22 and 24, respectively, of undercarriage 10. Constituting part of the drive system, axle 26 of rear wheel 24 receives power by means of first sprocket 50 which is connected to drive sprocket 48 by means of chain 52. Also attached to axle 26 of rear wheel 24 is sprocket 62. Sprocket 62 is coupled by means of chain 64 to sprocket 66, which is connected to the axle 26 of middle wheel 22. Sprocket 68 is also attached to the axle 26 of the middle wheels 22 of the set, and in turn is coupled by means of chain 70 to sprocket 72. Sprocket 72 is secured to the axle 26 of the forward wheel 20 of the set, whereby motor 30 is operatively connected to all three wheels 18 on undercarriage 10. Tension adjustment assemblies 74 are provided for assuring proper tension in chains 64 and 70.

In order to arrest movement of undercarriage 10, brake assembly 76 is provided. Brake assembly 76 consists of a brake disc 78 and three caliper assemblies 80. Turning momentarily to FIG. 3b in conjunction with FIGS. 1 and 2, caliper assemblies 80 (only one of which is shown) are anchored to frame extension 82 by means of bolts 84. Consequently, the caliper assemblies 80 remain stationary at all times, while the brake disc 78, which is secured to axle 26 of the middle wheel 22, rotates therewith. Specifically, brake disc 78 rotates within the slots of the three caliper assemblies 80 which house the brake pucks and their hydraulic actuating cylinders. To arrest movement of the undercarriage 10, the actuating cylinders cause the pucks to frictionally engage discs 78. By means of chains 64 and 70, this braking force is directly transmitted to the rearward and forward wheels, 24 and 20, respectively. In this manner, the force of one brake assembly 76 is simultaneously applied to all wheels on the undercarriage 10. It will be noted that brake assembly 76 is disposed to the interior of axle spindle 86, to which wheel rim 88 is secured by threaded lugs 90. This location for brake assembly 76 is advantageous in that it affords protection from dirt, rocks, mud or other debris typically encountered by an adverse terrain vehicle.

Middle wheel 22 protrudes below a plane 92 extending tangent to the bottom surfaces of the wheels 18 comprising the forward wheel 20 and the rear wheel 24. This fact embodies a significant feature of the present invention. A relatively short wheelbase is desirable because it facilitates skid steering of the vehicle. However, this advantage is offset by decreased overall vehicle stability, which is especially troublesome in the case of an adverse terrain vehicle with variable loading arrangements. In contrast, a longer wheelbase affords maximum vehicle stability but does not permit effective skid steering.

The present invention economically and simply accomplishes the objectives of both short and long wheelbases by means of a lower middle wheel 22. For example, when operated over a hard, smooth surface, undercarriage 10 will be able to rock either forwardly or backwardly, depending upon the location of the center of gravity and the loading characteristics of the particular adverse terrain vehicle. The vehicle rests on only two wheels at any given moment, while an end wheel remains available for stabilization. Therefore, the wheelbase of the vehicle will comprise the distance between the middle wheel 22 and one of the endmost wheels, either 20 or 24. Consequently, the effort required to effect skid steering of the behicle is substantially reduced over that which would be required if the wheelbase always comprised the distance between the endmost wheels 20 and 24. At the same time, the rocking feature of undercarriage 10 allows instant utilization of the stability inherent in a longer wheelbase.

Assume now that the vehicle to which undercarriage 10 is attached is operated over a softer surface, such as sand, mud or loose dirt. All three wheels 18 will engage the adverse surface because they will sink into the adverse surface until vehicle flotation occurs. Superior traction, stability and maneuverability will be achieved since each wheel 18 directly contacts the surface, and all wheels 18 are drivingly interconnected. Furthermore, total pressure under any individual wheel is substantially reduced, which lessens surface rutting as well as the vehicle's susceptibility to bogging down.

Turning now to FIGS. 3a and 3b, there is shown in detail the drive system for undercarriage 10. Motor 30 is coupled to speed reducer 40. Speed reducer 40 is attached to frame extension 42 by means of bolts 94 in conjunction with nuts 96. By means of slots 98, speed reducer 40 is adapted for slidable movement relative to frame extension 42 when acted upon by tension adjusting bolt 58, which is best shown in FIG. 1. Attached to the output shaft 46 of the speed reducer 40 is sprocket 48. Setscrew 49 secures sprocket 48 to output shaft 46. Chain 52 in turn connects sprocket 48 to sprocket 50. Sprocket 50 is affixed to axle 26 of rear wheel 24 by means of nut 100. It will be noted that all three axles 26 are rotatably supported by the inner bearing assemblies 102 and outer bearing assemblies 104. Inner bearing assemblies 102 are supported by cups 106 which are detachably secured to frame 12 by means of bolts 108. In contrast, outer bearing assemblies 104 are permanently affixed to frame extensions 82 of frame 12.

Sprocket 62 is also attached to axle 26 of rear wheel 24 by means of keyway 110, thus sprocket 62 rotates in unison with sprocket 50. Sprocket 62 in turn is connected by means of chain 64 to sprocket 66, which is secured to axle 26 of middle wheel 22 by means of a keyway 112. Located substantially adjacent to sprocket 66 and also attached to axle 26 of middle wheel 22 by means of keyway 112 is sprocket 68. Chain 70 is constrained for rotation around sprockets 68 and 72. Sprocket 72 is affixed to axle 26 of forward wheel 20 by means of keyway 114. Consequently motor 30 is directly connected by a series of sprockets and chains to each wheel 18 of undercarriage 10.

The tension in chains 64 and 70 is adjusted by means of forward and rear tension adjustment assemblies 74. Tension adjustment assemblies 74 include idler sprocket 116 which engage the slack or return sides of either chain 64 or 70. Idler sprocket 116 is rotatably connected to pin 118 by means of journal bearing 120. The pin 118 which rotatably supports idler sprocket 114 is disposed and secured between two vertical adjacent wall surfaces of slider assembly 122. Slider assembly 122 is constrained for vertical movement by stops 124 and 126. Vertical movement of slider assembly 122 is accomplished by means of adjustable screws 128. Either clockwise or counterclockwise movement of adjustable screws 128 serves to displace slider assembly 122 vertically, whereby idler sprocket 116 engages idler chains 64 or 70 so as to change the tension therein. For example, if idler sprocket 116 of forward tension adjustment assembly 74 were mainpulated in a vertical direction, it would engage chain 70 so as to cause a small but significant increase in the effective travel distance thereof. This in turn would cause chain 70 to experience an increase in tension, because it is of substantially fixed length.

Protective covers 130 are provided to protect the inward ends of axles 26 of forward wheel 20 and middle wheel 22. Covers 130 are secured to bearing cup 106 by means of screws 132. Consequently, all inward ends of axles 26 on undercarriage 10 are shielded from rocks, dirt, mud, or other hazards to be found in the terrain over which the adverse terrain vehicle is likely to operate.

The foregoing description was directed to the preferred construction of undercarriage 10 wherein each wheel 18 is interconnected by a series of sprockets and chains. However, it will be understood that undercarriage 10 can be operated with other transmission means, such as gears or other means; and such that motor 30 is drivingly connected to less than all of the wheels 18. For example, motor 30 can be drivingly connected to rear wheel 24 and middle wheel 22 only, thereby eliminating the need for sprockets 68 and 72, chain 70, and forward tension adjustment assembly 74 all of which serve to interconnect forward wheel 20 and middle wheel 22.

Referring now to FIGS. 4 and 5, there are shown two modifications of the three wheel undercarriage for an adverse terrain vehicle 10. Referring particularly to FIG. 4, there is shown an alternative position for the hydrostatic drive assembly 28. The position illustrated in FIG. 4 is higher and more rearward than that depicted in FIGS. 1 and 2, but still disposed substantially between rear wheel 24 and middle wheel 22. The wheel spacing in FIG. 4 is relatively closer than that shown in FIGS. 1 and 2. FIG. 5 illustrates another alternative position for hydrostatic drive assembly 28 which permits reduced wheel spacing of undercarrige 10 over that shown in FIG. 4. In this modification, drive assembly 28 is mounted on rear frame extension 134. The closer wheel placement permitted by the modifications appearing in FIGS. 4 and 5 facilitates skid steering of undercarriage 10 because the effort required is substantially reduced over that which would be required if the wheel base were longer. Accordingly, not only are the power requirements for steering the vehicle lowered, but overall vehicle response is improved. Moreover, the feature of being able to vary the wheel spacing and/or the hydrostatic drive housing location considerably enhances the adaptability of undercarriage 10 to virtually any type of adverse terrain vehicle.

Referring now to FIGS. 15 and 16, there is shown another modification of the three wheel undercarriage for an adverse terrain vehicle 10. At least two significant features attend this modification. First, instead of supporting hydrostatic drive assembly 28 with a frame extension attached to the top surface of frame 12, drive assembly 28 is slidably mounted directly on the rear portion of frame 12. Frame 12 in FIGS. 15 and 16 includes an integral raised rear portion which serves to house and protect sprockets 48 and 50, and drive chain 52. Besides eliminating the need for a separate housing to protect these parts of the drive system, placement of drive assembly 28 on the side of frame 12 opposite wheels 18 makes it less vulnerable to flying rocks, dirt, mud and objects likely to be picked up by the wheels of the vehicle. In addition, this location for drive assembly 28 allows a lower profile which further enhances adaptability of undercarriage 10 to various types of adverse terrain vehicles. Bolt 58 is threadably mounted on brace 60 which is now attached directly to the rear top and side portions of frame 12. Bolt 58 acts in tension directly on the collar of speed reducer 40 to serve as a tension adjusting means for chain 52. The absence of brake assembly 76 secured to middle wheel 22 comprises the second feature of the modification illustrated in FIGS. 15 and 16. Instead, brake assembly 133 is positioned directly between motor 30 and speed reducer 40. Brake 133 may be of the AUSCO brand fail-safe type produced by Auto Specialties Manufacturing Co. of St. Joseph, Mich. It has been found that placement of brake 133 in drive assembly 28 requires lower braking effort which results in increased brake efficiency. If desired, access plates (not shown) can be located in the upper surface of frame 12 above the axles for wheels 18. In all other respects undercarriage 10 with the modification shown in FIGS. 15 and 16 operates as was described above.

Referring now to FIGS. 7 and 8, there is shown an undercarriage for an adverse terrain vehicle 136 incorporating a second embodiment of the invention. The undercarriage 136 incorporates numerous component parts which are substantially identical in construction and operation to the component parts of undercarriage 10 illustrated in FIGS. 1 and 2. Such identical component parts are designated in FIGS. 7 and 8 with the same reference numeral utilized in the description of undercarriage 10, but are differentiated therefrom by means of a prime (') designation.

The primary differentiation between undercarriage 10 and undercarriage 136 is the fact of a four wheel embodiment, wherein wheel 138 is the fourth wheel. The extra wheel 138 is in fact another middle wheel. The middle wheels 22' and 138 extend below plane 92' which is tangent to the bottom surfaces of wheels 20' and 24'. All wheels 18' are of equal diameter and may include tires of either a solid or a pneumatic type. However, the addition of lower middle wheel 138 reuires the addition of two more sprockets, 140 and 144, and another chain 142, and may necessitate an additional brake assembly 76'.

In may respects similar to the three wheel configuration, the transmission of power in the four wheel configuration shown in FIGS. 7 and 8 proceeds as follows. The hydrostatic drive assembly 28' is mounted on the rearmost upper surface of undercarriage 136 and includes motor 30'. Motor 30' is connected directly to speed reducer 40'. Attached to the output shaft 46' of speed reducer 40' is sprocket 48'. Chain 52' is constrained for rotation about sprockets 48' and 50'. Sprocket 50' in turn is secured to the axle 26' of rear wheel 24'. Also attached to the axle 26' of rear wheel 24' is sprocket 62'. Connected by chain 64', sprocket 66' is constrained to rotate in unison with sprocket 62'. Sprocket 66' is mounted on axle 26' of middle wheel 22', as is sprocket 68'. Chain 142 in turn connects sprocket 140, which is affixed to axle 26' on second middle wheel 138, and sprocket 68'. Sprocket 144, which is also attached to axle 26' of second middle wheel 138, is connected by means of chain 70' to sprocket 72' which is mounted on axle 26' of forward wheel 20'. Thus, it is apparent that motor 30' is in direct mechanical communication with all four wheels of undercarriage 136 by virtue of the aforementioned arrangement of sprockets and chains. It wil be understood that undercarriage 136 can be operated where motor 30' is drivingly connected to fewer than all four wheels. Note also that hydrostatic drive guard 146 is provided at a rearward lower position on undercarriage 136 adjacent to drive assembly 28' so as to protect it from the hazards of operation over adverse terrain. In all other respects, the four wheel embodiment illustrated in FIGS. 7 and 8 operates substantially the same as the three wheel embodiment shown in FIGS. 1 and 2.

In certain applications, it may be desirable to adjust the height of an end wheel of undercarriage 10, or one or both end wheels of undercarriage 136. Referring now to FIG. 10, there is shown a wheel height adjustment assembly 148. Adjustment assembly 148 comprises a subframe 150 which is pivotally attached to frame 12 at pin 152. The outside vertical walls of subframe 150 are interposed between the inside vertical walls of frame 12 so as to allow connection at, and pivotal movement about, pin 152. A hydraulic cylinder 154 is attached at one end to a frame 156 mounted on frame 12, and at the other end to a frame 158 mounted on subframe 150. A boot 160 of highly resilient, flexible material is securely attached to seal the gap existing between frame 12 and subframe 150. When actuated, cylinder 154 causes subframe 150 to pivot downwardly about pin 152 so as to bring into alignment the axes of rotation of wheels 18. Turning momentarily to FIGS. 1 and 2 in conjunction with FIG. 10, it will be seen that provision has been made for the incorporation of one wheel height adjustment assembly 148 in the three wheel embodiment shown therein, at the location indicated by arrow 148a. Wheel height adjustment assembly 148 is positioned between forward wheel 20 and middle wheel 22. Upon actuation of hydraulic cylinder 154, subframe 150 will pivot downwardly about pin 152 so as to bring the axes of rotation of wheels 20, 22 and 24 into alignment.

In contrast to the three wheel embodiment of undercarriage 10, two wheel height adjustment assemblies 148, indicated by arrows 147 and 149, can be incorporated in the four wheel embodiment of undercarriage 136. Having reference momentarily to FIGS. 7 and 8 in conjunction with FIG. 10, it will be seen that forward wheel height adjustment assembly 148 is located between forward wheel 20' and middle wheel 138, while rear wheel height adjustment assembly 148 is positioned between rear wheel 24' and middle wheel 22'. Upon actuation of hydraulic cylinder 154 of forward wheel height adjustment assembly 148, subframe 150 will pivot downwardly to bring into alignment the axes of rotation of the forward three wheels of undercarriage 136. Similarly, the axes of rotation of the rearward three wheels of undercarriage 136 will become aligned upon the urging of cylinder 154 of rear wheel height adjustment assembly 148. The simultaneous actuation of cylinders 154 in both assemblies will cause the axes of rotation of all four wheels 18' to come into alignment.

The incorporation of wheel height adjustment assemblies 148 affords a significant advantage of both the three and four wheel lowered center wheel embodiments of the invention. Primarily it will effect better weight distribution and hence impart greater vehicle stability. In particular, during operation of the adverse terrain vehicle over a hard surface, the operator may selectively lower the end wheel or wheels should the skid steering advantages of a short wheelbase no longer be desired. For example, it might be desirable to stabilize a mobile drill rig incorporating the invention after the vehicle had been maneuvered into place. The capability of selectively nullifying the rocking feature of the present invention is particularly useful to vehicles whose center of gravity shifts during various operational modes. It will be understood that soft surface operation of a vehicle incorporating the invention is the same with or without the wheel height adjustment feature. All wheels will contact the soft surface, thus improving the vehicle's traction and flotation characteristics.

Figure 17:
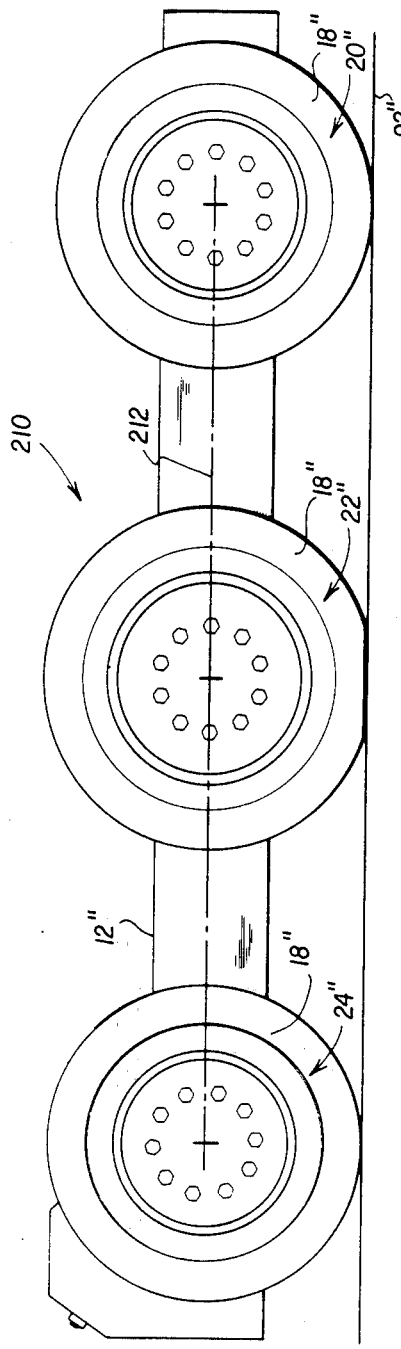
FIG. 17 is a side view of an undercarriage for an adverse terrain vehicle incorporating a third embodiment of the invention.

With reference to FIG. 17, there is shown an undercarriage for an adverse terrain vehicle 210 incorporating a third embodiment of the invention. The undercarriage 210 includes numerous component parts which are substantially identical in construction and operation to the component parts of undercarriage 10 illustrated in FIGS. 1 and 2. Such identical component parts are designated in FIG. 17 with the same reference numeral utilized in the description of undercarriage 10, but are differentiated therefrom by means of a double prime (") designation.

The primary distinction between undercarriage 210 and undercarriage 10 is the fact of a three wheel embodiment wherein the diameters of the wheels 18" are not identical. More particularly, middle wheel 22" is of relatively larger diameter than are the endmost wheels 20" and 24". Additionally, each wheel 18" rotates about an axle lying on a common line of centers, which is denoted by line 212. Thus, larger middle wheel 22" still protrudes below the plane 92" extending tangent to the bottom surfaces of forward wheel 20" and rear wheel 24", but for completely different reasons than its counterpart in undercarriage 10.

The fact of an aligned larger center wheel comprises a significant feature of this embodiment. The objectives of both a short and a long wheelbase is accomplished by means of larger middle wheel 22". For example, when operated over a hard, smooth surface undercarriage 210 will be able to rock either forwardly or backwardly, depending upon the location of the center of gravity and the loading characteristics of the particular adverse terrain vehicle. The vehicle rests on only two wheels at any given moment, while the other wheel remains available for stabilization. Consequently, the wheelbase of the vehicle when operated over a hard, smooth surface is the distance between wheel 22" and one of the endmost wheels, either 20" or 24". The effort required to effect skid steering of the vehicle is substantially reduced with a shorter wheelbase, while the rocking feature of undercarriage 210 allows recourse to the stability inherent with a longer wheelbase. It will be noted that if middle wheel 22" includes a pneumatic tire, the partial deflation thereof will serve to neutralize the rocking feature and bring all three wheels 18" into contact with the hard, smooth surface to improve vehicle traction and stability. Conversely, greater inflation of middle wheel 22" will serve to augment the rocking feature, if desired. Of course, during operation of undercarriage 210 over a softer surface, all three wheels 18" engage the adverse surface because they will sink into the surface until vehicle flotation occurs. Moreover, alignment of the axles of wheels 18" improves the vehicle performance over both hard and soft surfaces by reducing porpoising and other control problems associated with multiple nonaligned drive wheels. The power transmission and other aspects of the aligned three wheel embodiment illustrated in FIG. 17 are substantially identical to that of the nonaligned three wheel embodiment shown in FIGS. 1 and 2, and the modifications thereof, which were discussed hereinbefore.

Figure 18:
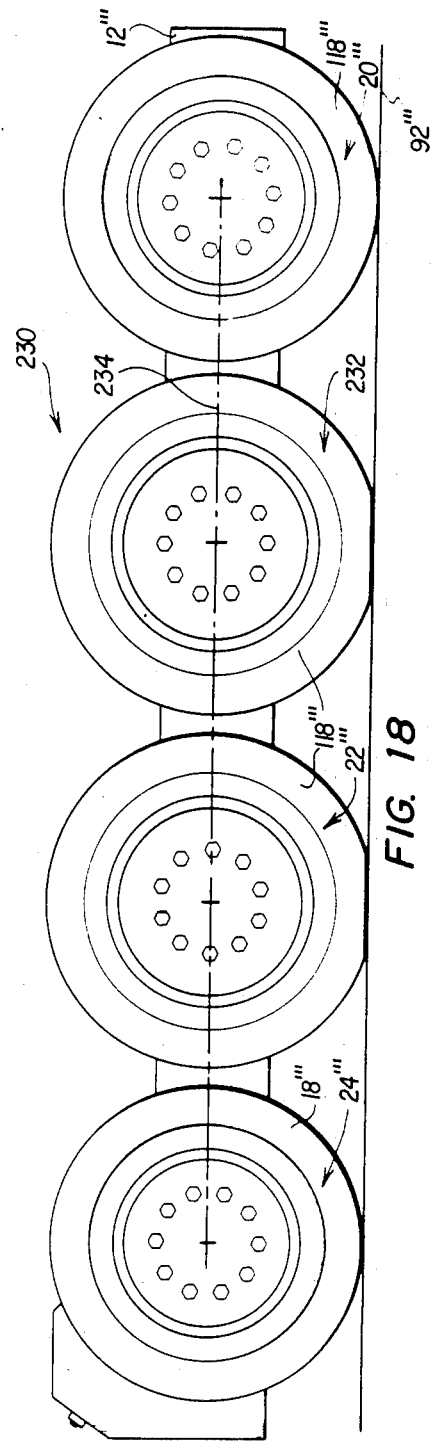
FIG. 18 is a side view of an undercarriage for an adverse terrain vehicle incorporating a fourth embodiment of the invention.

Turning now to FIG. 18, there is shown an undercarriage for an adverse terrain vehicle 230 incorporating a fourth embodiment of the invention. The undercarriage 230 includes numerous component parts which are substantially identical in construction and operation to the component parts of undercarrige 136 illustrated in FIGS. 7 and 8. Such identical component parts are designated in FIG. 18 with the same reference numeral utilized in the description of undercarriage 136, but are differentiated therefrom by means of a triple prime (''') designation.

The primary distinction between undercarriage 230 and undercarriage 136 is the fact of a four wheel embodiment wherein the diameters of the wheels 18''' are not identical. More particularly, middle wheels 22''' and 232 are of relatively larger diameter than are the endmost wheels 20''' and 24'''. Additionally, each wheel 18''' rotates about an axle lying on a common line of centers, which is denoted by line 234. Thus, larger middle wheels 22''' and 232 protrude below the plane 92''' extending tangent to the bottom surfaces of forward wheel 20''' and rear wheel 24''', but for completely different reasons than their counterparts in undercarriage 136.

The fact of aligned larger center wheels comprises a significant feature of this embodiment. The objectives of both a short and a long wheelbase is accomplished by means of larger middle wheels 22''' and 232. For example, when operated over a hard, smooth surface, undercarriage 230 will be able to rock either forwardly or backwardly, depending upon the location of the center of gravity and the loading characteristics of the particular adverse terrain vehicle. The vehicle rests on only two wheels at any given moment, while the other wheels remain available for stabilization. Consequently, the wheelbase of the vehicle when operated over a hard, smooth surface is the distance between wheels 22''' and 232 and one of the endmost wheels, either 20''' or 24'''. Therefore, the effort required to effect skid steering of the vehicle is substantially reduced with a shorter wheelbase, while the rocking feature of undercarriage 230 allows recourse to the stability inherent with a longer wheelbase. It will be noted that if the center wheels 18''' include pneumatic tires, the partial deflation thereof will serve to neutralize the rocking feature to bring all four wheels 18''' into contact with the hard, smooth surface improving vehicle traction and stability. Conversely, greater inflation of middle wheels 22''' and 232 will serve to augment the rocking feature, if desired. Of course, during operation of undercarriage 230 over a softer surface, all four wheels 18''' engage the adverse surface because they will sink into the surface until vehicle flotation occurs. Moreover, alignment of the axles of wheels 18''' improves the vehicle performance over both hard and soft surfaces by reducing porpoising and other control problems associated with multiple nonaligned drive wheels. The power transmission and other aspects of the aligned three wheel embodiment illustrated in FIG. 18 is substantially identical to that of the nonaligned four wheel embodiment depicted in FIGS. 7 and 8, and the modifications therof, which were discussed previously.

Referring now to FIG. 9, there is shown a T-handle 162 which can be mounted in the cockpit of the adverse terrain vehicle to which the invention is attached. T-handle 162 performs the function of controlling the flow of energy from a remote source (not shown) to the motor(s) of the hydrostatic drive system. The T-handle 162 is supported for pivotal movement about horizontal and vertical axes 164 and 166, respectively. The handle 162 includes a pair of handle grips 168 and a lower portion 170 extending parallel to handle grips 168. Thus, manipulation of the handle grips 168 relative to axes 164 and 166 results in a directly corresponding motion in lower handle portion 170.

The lower handle portion 170 of the T-handle 162 is coupled to a pair of levers 172 by means of a pair of links 174. The levers 172 serve to control the energy flow rate to the motors. In this way, the T-handle 162 is operable to provide complete control over the direction, speed, and steering of the vehicle incorporating the invention. Manipulation of the T-handle 162 solely about the horizontal axis 164 causes movement of both the levers 172 in the same direction by the same amounts. By this means, the motors are actuated in synchronism for propulsion of the vehicle either forwardly or rearwardly along a straight line. Similarly, manipulation of T-handle 162 solely about the vertical axis 166 causes equal and opposite flow of motive energy to the motors whereby the vehicle pivots about its center, but does not move either forward or rearward. Of course, any combination of manipulations about axes 164 and 166 is possible to effect complete control of the adverse terrain vehicle. A pair of springs 176 are provided for returning the levers 172 to their center or nil position wherein the remote power source (not shown) provides no output to the motors.

In reference now to FIGS. 11–14, there are shown several vehicles to which either the lowered center wheel(s) or larger center wheel(s) embodiments of the undercarriage of the present invention can be adapted. Although each vehicle has a different operational and loading profile, the present invention is equally compatible with all. It will be understood that wheel height adjustment assemblies 147 and 149, or 148 can be adapted to each vehicle utilizing lowered center wheels to impart additional stability, if desired.

FIG. 11 illustrates application of the undercarriage 10 to a front-end loader 188. The heaviest component of the machine, the engine 180, is located to the rear of the vehicle. In the unloaded condition, with the bucket 182 retracted and empty, the center of gravity is located rearward near the engine 180 so that the vehicle rests on its rear and middle pairs of wheels. After loading and upon extension of the unloaded bucket 182, the center of gravity shifts forward, which causes the vehicle to rock forward to rest upon its forward and middle pairs of wheels.

Shown in FIG. 12, borne by undercarriage 10, is a front-end loader 184 equipped with a backhoe 190 equipped with a bucket for excavation. The engine 186 is mounted forward. The center of gravity will be located forward near the engine 186 when the empty bucket 188 is retracted, and the empty backhoe 190 is tucked in. The vehicle in the unloaded configuration will thus be supported by its forward and middle sets of wheels. If the bucket 188 alone is loaded and extended, the vehicle's center of gravity remains forward and the vehicle will continue to rest on its forward and middle pairs of wheels. If only the backhoe 190 is manipulated, the center of gravity will shift rearward causing the vehicle to rock back and rest on its rearward and middle pairs of wheels. Of course, during combined operation of the bucket 188 and the backhoe 190, the vehicle may rock either forwardly or rearwardly depending on the relative loads manipulated.

FIG. 13 depicts undercarriage 136 as applied to a mobile drilling rig 192. During transportation, the drilling mast 194 lies substantially parallel to the vehicle. The weight of the mast 194 when added to that of the forwardly located engine 196 causes the vehicle to rest upon its forward and middle pairs of wheels. Upon raising mast 194 into drilling position, the center of gravity shifts rearward to reposition the vehicle on the rearward and middle sets of wheels.

A backhoe excavation 198 is shown in FIG. 14 supported on undercarrige 136. Owing to the rearward engine 200 locations, the vehicle rests on its rearward and middle pairs of wheels when the bucket 202 is tucked in and empty. During manipulation of the bucket 202, the vehicle rocks forwrd to be supported by the forward and middle pairs of wheels.

While each of the example applications of the invention appearing in FIG. 11–14 was discussed above as though the vehicle were operating over hard, smooth terrain, it will be understood that while operating over softer terrain, all wheels would contact the surface, achieving better flotation and traction.

Figure 19:
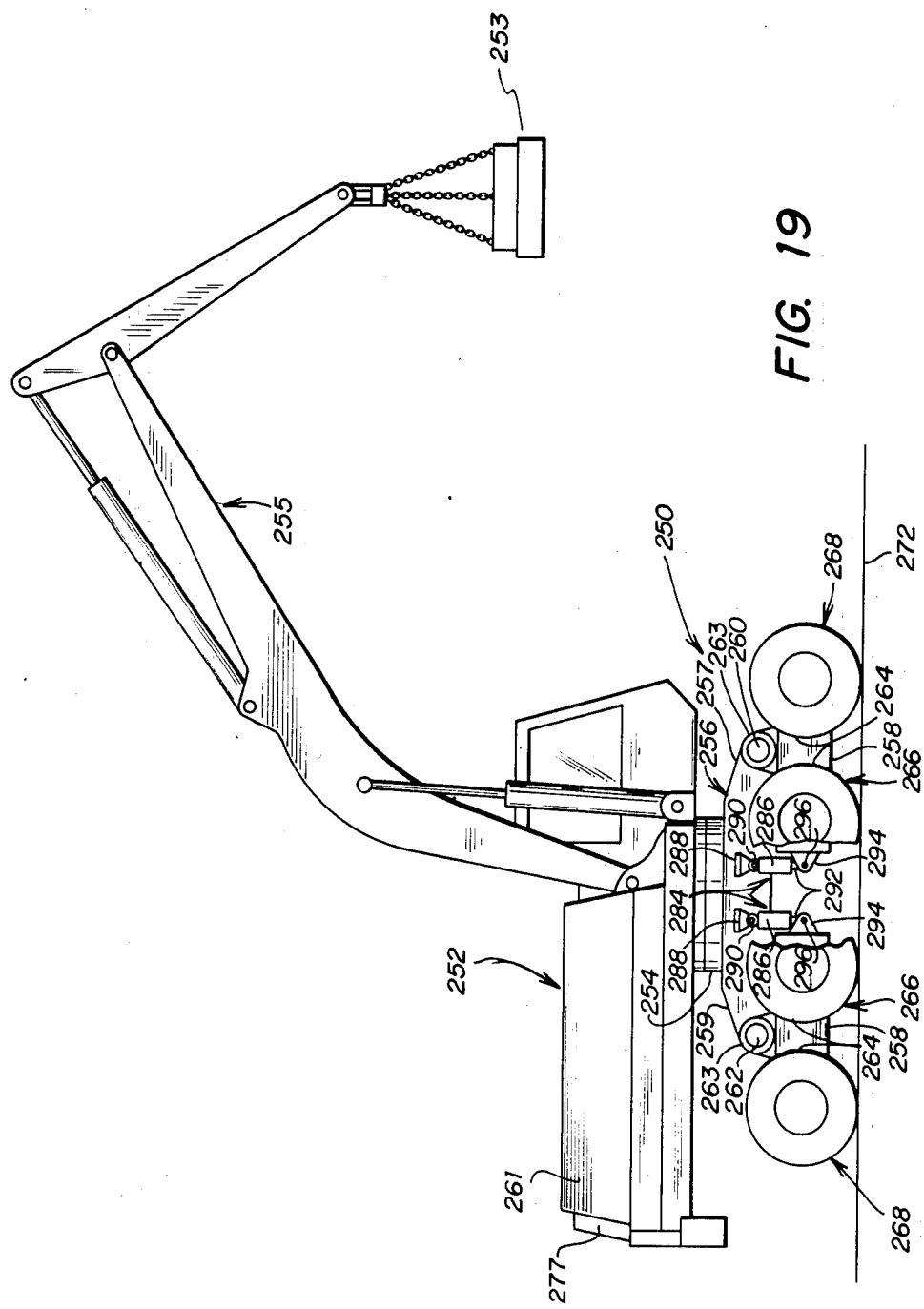
FIG. 19 is a side view of an undercarriage supporting a scrap handling mechanism incorporating a fifth embodiment of the invention.

Referring now to FIGS. 19–26, there is shown a detachable undercarriage 250 for an adverse terrain vehicle incorporating a fifth embodiment of the present invention. As illustrated in FIG. 19, undercarriage 250 may support a mechanism such as a scrap handling mechanism 252. The scrap handling mechanism 252 is pivotally supported on the pedestal mount 254 of the undercarriage 250. The mechanism 252 includes a scrap handling magnet 253 for lifting scrap suspended from an articulated arm assembly 255. An engine 261 mounted in the mechanism powers the magnet 253 and provides energy to propel the undercarriage 250 and mechanism 252 as discussed hereinafter.

Figure 20:
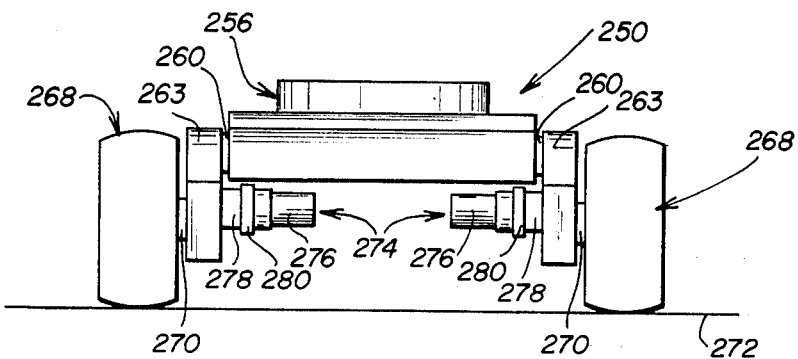
FIG. 20 is an end view of the undercarriage incorporating the fifth embodiment of the invention.
Figure 21:
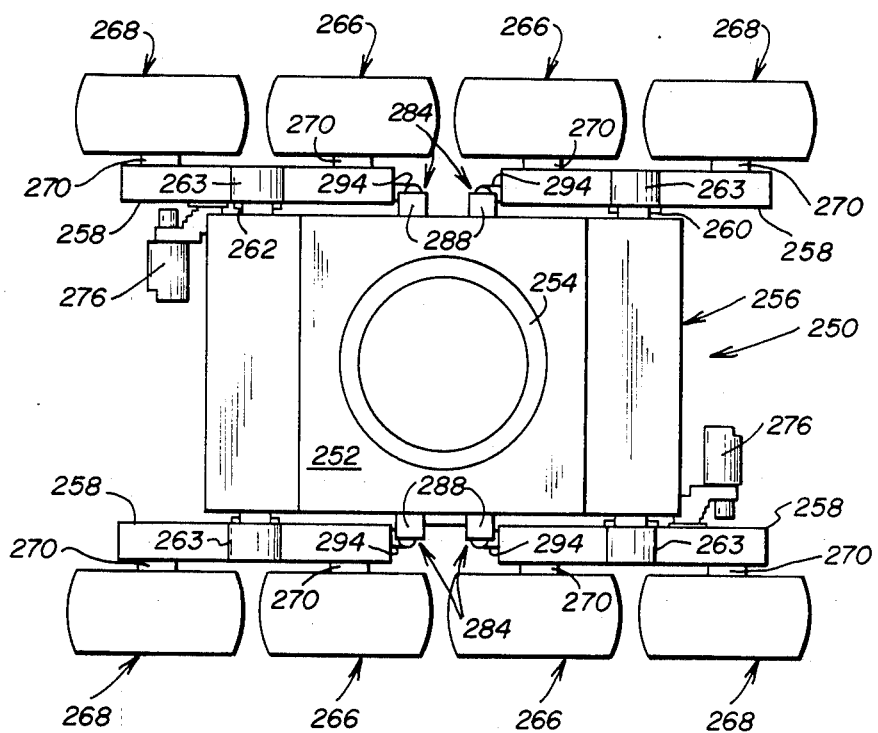
FIG. 21 is a top view of the undercarriage incorporating the fifth embodiment of the invention.

With reference now to FIGS. 19–21, undercarriage 250 is seen to include a main frame 256 and side frames 258 pivotally mounted to main frame 256 at the fore end 257 and aft end 259 of the main frame and on both sides thereof. A cross shaft 260 is secured beneath main frame 252 and extends outward on either side of the main frame to form the point of attachment for the side frames 258 at the fore end 257 of the undercarriage 250. A cross shaft 262 is mounted beneath main frame 256 and also extends outward from the sides for attaching side frames 258 at the aft end 259 of the undercarriage 250. A member 263 is secured to the upper surface of each side frame 258 to pivotably mount the side frame at one end of a cross shaft.

The side frames 258 are elongate, hollow and load bearing and are formed entirely of a material such as steel characterized by high strength and rigidity. Furthermore, side frames 258 can be of a sealed construction so that they may serve as a lubricant reservoir if desired, as well as a structural member.

Each side frame 258 is supported on surface 272 by two wheels 264. When the side frames 258 are mounted on main frame 256, the pair of wheels 264 on each side frame forms an inner wheel 266 and an outer wheel 268. The wheels 264 are of equal diameter and may include tires of either a solid or a pneumatic type. Wheels 264 rotate about axles 270 which preferably extend completely through side frames 258 and are rotatably supported within both adjacent vertical surfaces of side frame 258 in a manner similar to axles 26 in undercarriage 10.

Each side frame 258 is provided with a drive assembly 274. Drive assembly 274 incorporates a motor 276 which can be of a dual speed variety or, alternatively, can be of a constant speed variety. In addition, motor 276 can be of the electric or the hydraulic type. The motor 276 on each side frame is connected directly to a speed reducer 278, which can be of a multiple or constant speed type. The speed reducer 278 is mounted on the inner side of each side frame 258 and has an output shaft to which a drive sprocket (not shown) is attached so that the drive sprocket is within the side frame 258. Driven sprockets may be mounted on the axles 270 in each side frame 258. Chains may then be constrained about the drive sprocket and driven sprockets to transfer rotative movement to the axles 270 from motor 276. The drive and driven sprockets and chain are totally enclosed by side frame 258 which acts to protect these parts and to constitute a reservoir for lubricant in which the chain and sprockets continuously operate.

If, for example, motor 276 is of the hydraulic type, motive energy is received from the output of remotely located hydraulic pumps 277 driven by an engine mounted on the mechanism to which undercarriage 250 is attached such as engine 261 of mechanism 252. If motor 276 is of the electric type, motive energy may be provided by a generator or other power source driven by the engine of the mechanism. The power transmission by means of the pressurized hydraulic fluid from the aforementioned pumps, or from a power source in the case of an electric motor, to motor 276 and hence to the axles 270 of each side frame 258 comprises the drive system which functions to both propel and steer the undercarriage 250.

In order to slow or stop the undercarriage 250, a brake assembly 280 may be positioned between the motor 276 and speed reducer 278 for each side frame 258. The brake assembly 280 may be identical to brake 133 mentioned hereinabove.

A double-acting fluid cylinder 284 is positioned between the main frame 256 and the inner end of each of the side frames 258. The end of housing 286 of each fluid cylinder is pivotally mounted to a bracket 288 on main frame 256 by a pin 290. The exposed end of piston 292 in each fluid cylinder 284 is pivotally connected to a bracket 294, positioned on the inner end of side frame 258 by a pin 296. Pressure lines (not shown) are connected to the housing 286 of each fluid cylinder 284 for communication with the upper and lower chambers in the fluid cylinder on both sides of the piston head of piston 292. The pressure lines may be connected to a source of fluid pressure, such as a hydraulic pump mounted on the mechanism supported by undercarriage 250. In addition, the pressure lines between the chambers in cylinders 284 positioned at the fore and aft ends on one side of the undercarriage 250 may be interconnected to permit the side frames 258 to act as walking beams for moving over uneven surfaces in a manner described hereinafter.

Pressurized fluid may be provided to the chambers on both sides of the piston head of piston 292 in each fluid cylinder 284 so that the bottoms of inner wheels 266 and outer wheels 268 for all four side frames 258 are coplaner. The wheels and side frames 258 may be locked in this position by providing fluid at a sufficiently elevated pressure to both chambers in the fluid cylinders and subsequently blocking flow out of either chamber. In this position, the wheels and side frames are positioned so that the loading on each wheel is uniform on a relatively flat surface 263 and the undercarriage 250 provides the maximum fore and aft stability.

Figure 22:
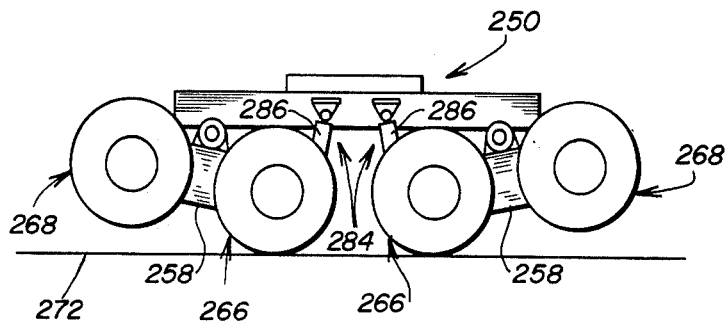
FIG. 22 is a side view of the undercarriage incorporating the, fifth embodiment of the invention with the side frames positioned for skid steering.

With reference to FIG. 22, a sufficient quantity of pressurized fluid may be provided to the upper chamber of each fluid cylinder 284 to extend the piston 292 out of the housing 286 and pivot each side frame around a cross shaft. In this position, the bottom of the inner wheels 266 lie in a plane below the plane in which the bottom surface of the outer wheels 268 are positioned. The side frames 258 may be locked in this position by providing fluid at a sufficiently elevated pressure to both chambers in each fluid cylinder. In this position, the undercarriage 250 has a relatively short wheelbase which is desirable to facilitate skid steering of the vehicle.

Figure 23:
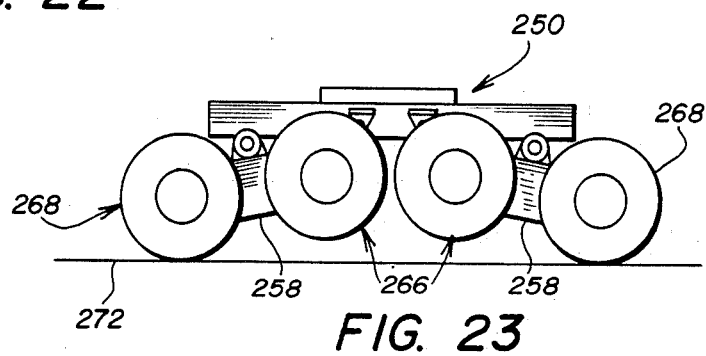
FIG. 23 is a side view of the undercarriage incorporating the fifth embodiment of the invention with the side frames positioned for stabilization with a long wheel base.

With reference to FIG. 23, pressurized fluid may be provided to the lower chamber of each fluid cylinder 284 so that the piston 292 retracts within the housing 286. This acts to pivot the side frames 258 so that the bottom surface of the outer wheels 268 lie in a plane beneath the plane containing the bottom surface of the inner wheels 266. Again, the side frames 258 may be locked in position by providing fluid at an elevated pressure in both chambers on both sides of the piston head of the pistons 292 in the fluid cylinders 284. This arrangement of wheels provides the relatively long wheelbase for stability with the outer wheels 268 contacting the surface 272. In addition, the main frame 256 is supported at a higher elevation off the surface 272.

Figure 24:
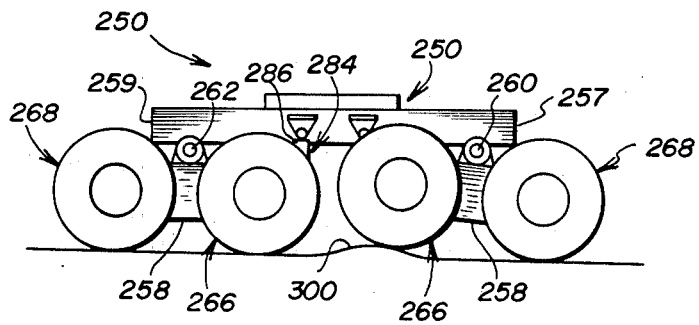
FIG. 24 is a side view of the undercarriage incorporating the fifth embodiment of the invention with the side frames pivoting to compensate for the terrain.
Figure 25:
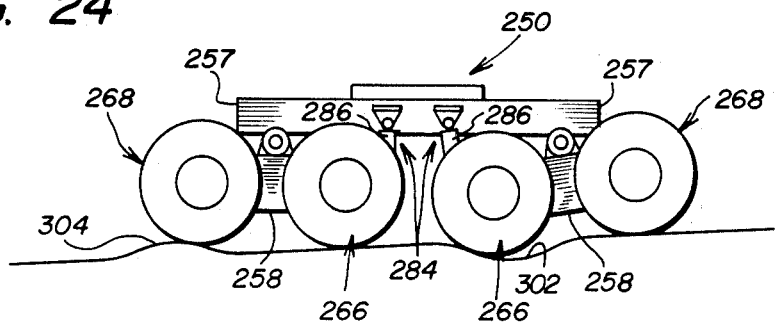
FIG. 25 is a side view of the undercarriage incorporating the fifth embodiment of the invention with the side frames pivoting to compensate for the terrain.

With reference to FIGS. 24 and 25, the fluid lines to each chamber fluid cylinder 284 may be interconnected so that fluid may interflow from one side of the piston head to the other. In this manner, the individual fluid cylinders 284 permit the side frames 258 to act as walking beams so that the force applied to the inner wheel 266 and outer wheel 268 of each side frame is equal regardless of the roughness of the terrain. For example, as shown in FIG. 24, the undercarriage 250 may be propelled over an elevated bump 300. When the inner wheel 266 of the side frame pivoted at the fore end 257 of the main frame rides up on bump 300, the side frame pivots about cross shaft 260 as shown so that the force acting on each wheel remains relatively constant. With the chambers within housing 286 interconnected, the fluid in the upper chamber of housing 286 will flow into the lower chamber of the housing as the side frame is pivoted. As shown in FIG. 25, when the inner wheel 266 of the side frame of the fore end 257 of the main frame 256 encounters a dip 302, the side frame will pivot as shown so that the force acting on the inner and outer wheels 266 and 268 remains relatively constant. The fluid within the lower chamber of housing 286 interflows into the upper chamber of housing 286 as the side frame is pivoted. The action of the side frame pivoted at the aft end 259 of main frame 256 on bump 304 is identical to that described above with reference to bump 300 in FIG. 24. By providing some resistance to the interflow of fluid between the chambers of each fluid cylinder, the fluid cylinders may also act as shock absorbers. The significant advantage of the walking beam type side frame is its ability to pivot about its point of attachment to the main frame to maintain a relatively equal force on the wheels. This equalizes wear on the wheels and reduces the oscillation and bouncing of the mechanisms supported on the undercarriage.

Figure 26:
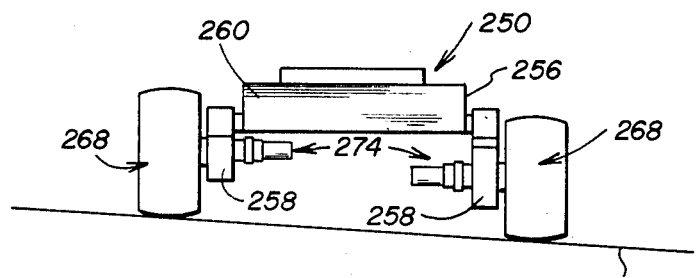
FIG. 26 is an end view of the undercarriage incorporating the fifth embodiment of the invention with the side frames positioned to level the undercarriage on a slope.

With reference to FIG. 26, the surface 308 on which undercarriage 250 is propelled may be sloped in a direction transverse to the motion of the undercarriage as shown. The mechanism supported on the undercarriage 250 may be retained level by lowering either the inner or outer wheels of the side frames on the down slope side of the undercarriage so that the bottom surface of the lowered wheels lies in a plane below the bottom surface of the wheels on the opposite side of the undercarriage. By lowering the wheels on the down slope side to compensate for the slope of the surface, the mechanism may be leveled as shown in FIG. 26. The undercarriage 250 may also maintain the mechanism supported thereon in a leveled condition for moderate slopes parallel the direction of motion of the undercarriage by pivoting the side frames attached to the fore and aft ends of the main frame to compensate for the slope.

Figure 27:
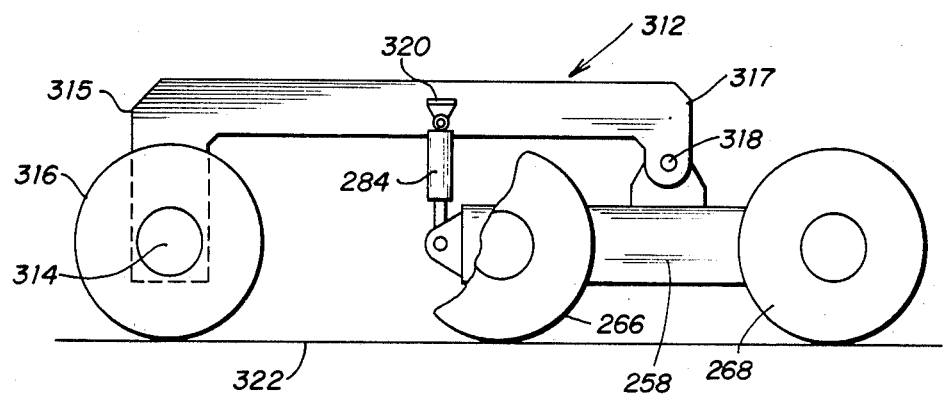
FIG. 27 is a side view of a first modification of the undercarriage of FIG. 19.

FIG. 27 illustrates a first modification of the fifth embodiment of the present invention. This modification includes a main frame 312 which is adapted for supporting a mechanism such as scrap handling mechanism 252. Main frame 312 rotatably supports an axle 314 at the aft end 315 thereof. A wheel 316 is fixed to the axle 314 for rotation. A side frame 258 is pivotally mounted to the fore end 317 of the main frame 312 by a pivot pin 318. A fluid cylinder 284 extends between the inner end of the side frame 258 and a bracket 320 fixed to the main frame 312. It will be understood that a side frame is pivotally secured to the main frame 312 on either side thereof at the fore end 317 and wheels 316 are rotatably secured on both sides of the main frame at the aft end 315 thereof.

In operation, the fluid cylinders may be operated to pivot the side frames so that the bottom surface of inner wheels 266 lie in a plane below the plane defined by the bottom surface of outer wheels 268 and wheels 316 to facilitate skid steering on surface 322 by providing a relatively short wheelbase. The fluid cylinders may be operated in a reverse direction to pivot the side frames so that the bottom surfaces of inner wheels 266 are coplanar or lie above the plane defined by the bottom surfaces of outer wheels 268 and wheels 316 to provide a relatively long wheelbase for stability on surface 322. The modification shown in FIG. 27 also may be adapted to permit interflow between the chambers of the fluid cylinders 284 to permit a walking beam motion over surface 322 as discussed above with reference to FIGS. 24 and 25.

Figure 28:
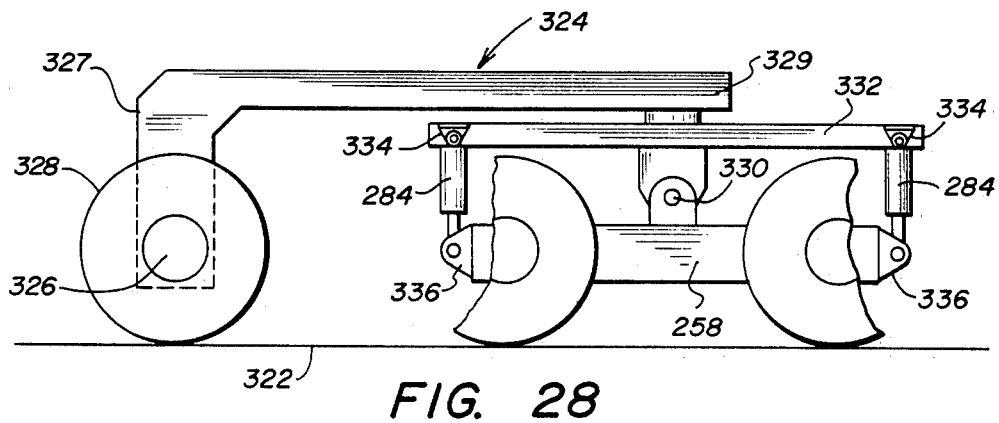
FIG. 28 is a side view of a second modification of the undercarriage of FIG. 19.

FIG. 28 illustrates a second modification of the fifth embodiment of the present invention. A main frame 324 is provided for supporting a mechanism which has axle 326 rotatably supported at the aft end 327 thereof. A wheel 328 is mounted on axle 326 as shown. A side frame 258 is pivotally mounted to both sides of main frame 324 at the fore end 329 thereof by a pin 330. A beam 332 is rigidly secured to the main frame 324 and extends fore and aft as shown. Brackets 334 are positioned at either end. Brackets 336 are provided at both the inner and outer end of each of the side frames as shown. Fluid cylinders 284 are pivotally interconnected between brackets 334 and brackets 336. The operation of the second modification as illustrated in FIG. 28 is substantially identical to the operation of the first modification illustrated in FIG. 27. The provision of two cylinders 284 permit the fluid pressure used in the fluid cylinders to be reduced or the cylinder size of each fluid cylinder may be reduced.

Thus it is apparent that there has been provided, in accordance with the invention, an undercarriage for an adverse terrain vehicle that fully satisfies the objects, aims and advantages set forth above. While the invention has been described in conjunction with specific embodiments thereof, it is evident that many alternatives, modifications, and variations will be apparent to those skilled in the art in view of the foregoing description. Accordingly, it is intended to embrace all such alternatives, modifications, and variations as fall within the spirit and scope of the invention.

We claim:

1. An undercarriage assembly for supporting and propelling a mechanism, comprising:

a main frame for connection to the mechanism;

side frames pivotally mounted adjacent the fore and aft ends of said main frame on either side of said main frame;

an inner and an outer axle member, each axle member being rotatably supported at longitudinally spaced points along each of said side frames and on opposite sides of the pivotal axis of said side frames, each of said axle members having a wheel receiving member at one end thereof;

at least one wheel member mounted on and secured to the wheel receiving member of each of said axle members;

transmission means positioned within each of said side frames for drivingly interconnecting said axle members, and transmission means including a plurality of sprockets each mounted on one of the axle members within said side frame and chain means constrained about said sprockets;

a plurality of drive means each mounted on and individual to the exterior of one of the side frames and operably connected to the transmission means thereof whereby said drive means and said transmission means cause concurrent rotation of the interconnected axle members, each of aid exteriorly mounted drive means comprising:

a speed reducer with an output shaft operably connected to the transmission means within said corresponding side frame;

a motor operably oonnected to said speed reducer; and a brake operably interposed between said motor and said speed reducer;

at least one double-acting fluid cylinder interconnecting said main frame and each of said side frames adjacent the inner axle member of each of said side frames for pivoting said side frames, wherein each fluid cylinder is substantially vertically mounted between said main frame and a point adjacent the inner axle member of the corresponding side frame; and pump means for providing pressurized fluid to each chamber of said fluid cylinders.

2. An undercarriage assembly for supporting and propelling a mechanism comprising:

a main frame for connection to the mechanism having a fore end with depending portions and an aft end with depending portions;

an axle mounted on the depending portions of the aft end of the main frame;

wheels rotatably fixed on each end of the axle;

a pair of side frames having inner and outer ends, each of said side frames being pivotally mounted on opposite sides of the main frame to the depending portions of the force end of the main frame;

at least two axle members rotatably supported at longitudinally spaced points along each of said side frames and on opposite sides of the pivotal axis of said side frames, each of said axle members having a wheel receiving member at one end thereof;

at least one wheel member mounted on and secured to the wheel receiving member of each of said axle members;

transmission means positioned within each of said side frames for drivingly interconnecting said axle members, said transmission means including a plurality of sprockets each mounted on one of the axle members within said side frame and chain means constrained about said sprockets;

a pair of drive means one mounted on and individual to the exterior of each of the side frames and operably connected to the transmission means thereof whereby said drive means and said transmission means cause concurrent rotation of the interconnected axle members, each of said exteriorly mounted drive means comprising:

a speed reducer with an output shaft operably connected to the transmission means within said corresponding side frame;

a motor operably connected to said speed reducer; and a brake operably interposed between said motor and said speed reducer;

at least one double-acting fluid cylinder interconnecting said main frame and the inner end of each of said side frames for pivoting said side frames; and pump means for providing pressurized fluid to each chamber of said fluid cylinders.

3. The undercarriage assembly of claim 2 wherein each fluid cylinder is substantially vertically mounted between said main frame and said inner end of the side frame.

4. An undercarriage assembly for supporting and propelling a mechanism comprising:

a main frame for connection to the mechanism having a fore end with depending portions and an aft end with depending portion;

an axle mounted on the depending portion of the aft end of the main frame;

wheels rotatably fixed on each end of the axle;

a pair of side frames pivotally mounted on opposite sides of the main frame to the depending portions of the fore end of the main frame;

at least two axle members rotatably supported at longitudinally spaced points along each of said side frames and on opposite sides of the pivotal axis of said side frames, each of said axle members having a wheel receiving member at one end thereof;

at least one wheel member mounted on and secured to the wheel receiving member of each of said axle members;

transmission means positioned within each of said side frames for drivingly interconnecting said axle members, said transmission means including a plurality of sprockets each mounted on one of the axle members within said side frame and chain means constrained about said sprockets;

a pair of drive means one mounted on and individual to the exterior of each of the side frames and operably connected to the transmission means thereof whereby said drive means and said transmission means cause concurrent rotation of the interconnected axle members, each of said exteriorly mounted drive means comprising:

a speed reducer with an output shaft operably connected to the transmission means within said corresponding side frame;
a motor operably connected to said speed reducer; and
a brake operably interposed between said motor and said speed reducer;
a pair of beams rigidly secured on opposite sides of the main frame to the depending portions of the fore end of said main frame, each beam extending longitudinally parallel to one of the side frames;
brackets positioned at each end of said beams;
substantially vertically mounted double-acting fluid cylinders interconnecting each bracket with its corresponding inner or outer end of said side frames for pivoting said side frames; and
pump means for providing pressurized fluid to each chamber of said fluid cylinders.

* * * * *